March 30, 1937.  G. C. DUNCAN, JR  2,075,029
FLUSH VALVE
Filed March 16, 1934
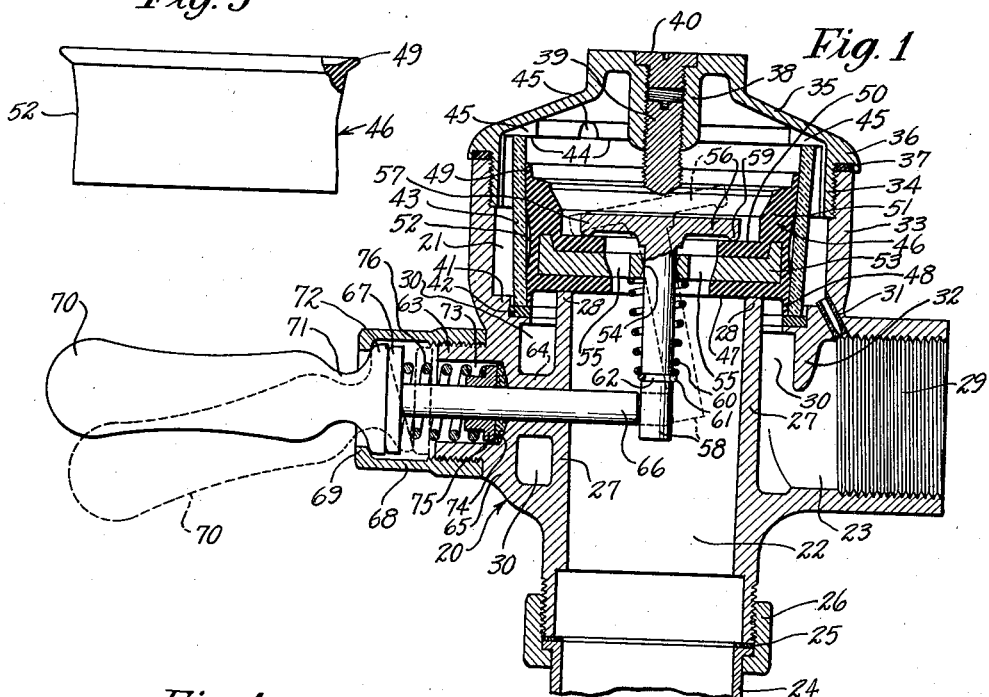
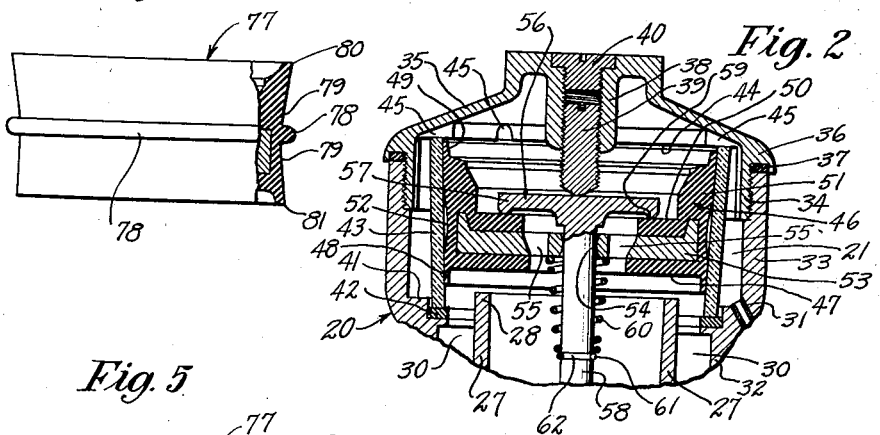
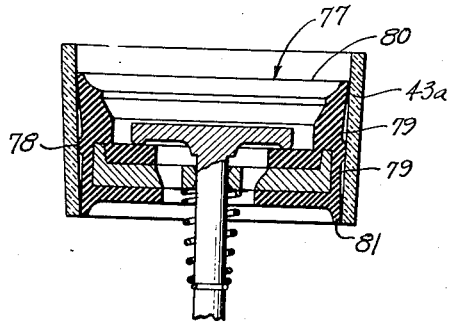
Inventor
George C. Duncan, Jr.
Attorney.

Patented Mar. 30, 1937

2,075,029

UNITED STATES PATENT OFFICE 2,075,029

FLUSH VALVE

George C. Duncan, Jr., Los Angeles, Calif., assignor, by mesne assignments, to Duncan No-Noise Valve & Bowl Company, Inc., a corporation of California Application March 16, 1934, Serial No. 715,829

19 Claims. (Cl. 137—93)

My invention relates to valves for the control of hydraulic flow, referring especially to flush valves, and is directed particularly to improvements in that type of flush valve in which a manually operable release valve controls the direction of preponderating pressure against a main-valve-actuating piston. Such valves are widely employed in lavatories.

In a tall building, a vacuum may be created in the water supply pipe when an outlet valve on a lower floor is open while the main valve of the building is closed. The vacuum resulting from partially evacuating of water pipes on floors above the opened outlet valve may register as low as 13 pounds per square inch below atmospheric pressure. It has been found that a differential much less than 13 pounds will initiate siphonage sufficient to open an ordinary flush valve and sufficient to draw water back through the flush valve into the fresh water supply pipe. It is highly desirable, therefore, to prevent reverse siphonage by designing the flush valve to withstand such reverse pressure.

I have attained this end largely by providing for friction between the piston and the surounding wall of the valve of sufficient effectiveness to hold the piston at the closed position against any vacuum encountered in practice; and it is an important object of my invention to provide such frictional relationship between the piston and the piston chamber without causing the piston to bind or to fail to move freely when required.

The features of my invention pertinent to this object, as well as other advantages had in the design, will be apparent and best explained in the detailed description that follows.

In the drawing—

Fig. 1 is a longitudinal central section of the complete valve in the closed position;

Fig. 2 is a similar view of a portion of the valve showing certain moving parts moved to the open position;

Fig. 3 is a side elevation, partly broken, of the combined piston and valve member, removed from the valve;

Fig. 4 is a similar view of a modified form of the combined piston and valve member; and Fig. 5 is an axial section taken through the modified form of piston and valve member, shown with certain coacting parts of the valve.

Valve body 20 forms a piston chamber 21, an outlet passage 22 concentric with the piston chamber, and a lateral inlet passage 23 below the piston chamber. A flanged outlet pipe 24 presses against a gasket 25 at the end of outlet passage 22 and is secured thereto in the usual manner by union nut 26. Outlet passage 22 is extended inward by a cylindrical wall 27, the inner rim 28 of which extends slightly into piston chamber 21 and serves as the main valve seat.

Inlet passage 23 is threaded at 29 in the usual manner, and terminates in an annular space 30 around cylindrical wall 27, which space, in turn, communicates with piston chamber 21.

In the operation of the valve, a by-pass is necessary to provide communication between the inlet passage and the piston chamber. Such provision may be made by boring a passage through the body of the valve to receive a Monel-metal core or liner 31, the core being restricted at its inlet end in order to provide self-cleaning action. Preferably, a portion 32 of the valve body extends into inlet passage 23 adjacent the by-pass sleeve 31 to partially obstruct the flow of water through the inlet passage, thereby forming back pressure to favor diversion of water through the by-pass.

The peripheral wall 33 of piston chamber 21 is threaded on the inside to receive the circular flange 34 of a valve cap 35. To provide a watertight joint, an external annular shoulder 36 of the cap is suitably recessed to receive a gasket 37, which presses against the edge of wall 33 when the parts are assembled. Cap 35 is provided with an inwardly extending axial boss 38, which boss is bored and threaded to receive a set-screw 39 and a protecting screw 40, for purposes which will be later apparent.

At the inner end of piston chamber 21, forming the rim of annular space 30, is an annular shoulder 41 suitably recessed to seat a ring gasket 42. Resting on gasket 42 is the lower edge of a sleeve or circular liner 43, the liner being confined between gasket 42 and annular shoulder 44 formed on the inside of cap 35. Sleeve 43 is made of hard, smooth, non-porous material, such as glass, and preferably is shaped as the frustrum of a cone, the smaller end resting upon lower gasket 42. In order to extend the by-pass communication to the piston chamber within sleeve 43, suitable grooves 45 are formed longitudinally along the inner surface of cap flange 34 and are extended radially inward across shoulder 44 of the cap.

A piston 46, preferably frusto-conical in shape, with the smaller end downward, is slidably embraced by sleeve 43 and is adapted to move to and from a position abutting rim 28 sealing outlet passage 22. The piston is made in one piece of rubber, preferably of a grade to resist chemical action, such as oil stock rubber; the lower face 47 of the piston may be provided with a peripheral flange 48 and the upper edge of the piston may be provided with a peripheral lip 49 that tends to press outward to the position shown in Fig. 3. These lips increase the sealing efficiency of the piston against liner 43.

The piston is hollowed out on its upper side, so that upper face 50 is surrounded by a relatively thick resilient wall 51. At about its middle point on its periphery the piston is centrally reduced in diameter to form a shallow and relatively wide peripheral recess 52. Embedded in the piston as a stiffener is a metal core preferably in the form of a perforated disc or spider 53 having an axial bore 54 and a series of similar bores 55 arranged concentrically thereto. The rubber is cut away to expose these apertures as shown in the drawing.

For the purpose of normally sealing the piston apertures, a relief valve 56 is provided in the form of a disc 57 of bronze or other material having an operating stem 58. Disc 57 is of a diameter to overlie all of the apertures 55, and is provided with a peripheral shoulder 59 to improve its sealing contact with face 50 of the piston. Valve stem 58 extends loosely through axial bore 54 and the bore is enlarged at each end to permit the relief valve to be rocked to some such position as that indicated by the dotted lines. A helical expansile spring 60, surrounding stem 58, is compressed between spider 53 and a spring wire clip 61 that seats in a peripheral recess 62 in the valve stem.

On level with the lower end of stem 58, valve body 20 is provided with an external radially extending boss 63 and is also provided with a cylindrical portion 64 in axial alignment therewith bridging annular space 30 between outer wall 65 of the body and inner wall 27 of outlet passage 22. Boss 63 and cylindrical portion 64 are axially bored to embrace slidingly a plunger 66 having a disc head 67 on its outer end.

The periphery of boss 63 is threaded to receive a retaining sleeve 68 that extends beyond the outer end of the boss. The outer end of sleeve 68 is flanged inward to form an annular shoulder 69. Sleeve 68 serves to retain, in a flexible manner, an operating handle 70, the reduced portion or neck 71 of which extends into the open end of the sleeve, the enlarged inner end 72 of the handle being engaged by annular shoulder 69.

The inner end of handle 70 presents a circular surface complementary to head 67 of plunger 66. Boss 63 has an axial counterbore 73 at the inner end of which packing 74 is held by a packing gland 75. A helical, expansile spring 76, surrounding plunger 66 and having one end seated against gland 75 and the other end in compression against head 67 of the plunger, serves the dual purpose of normally holding plunger 66 free of relief valve operating stem 58 and also of pressing gland 75 against packing 74.

When the valve is in the non-operative position, moving parts are positioned as shown in Fig. 1. Spring 76 retains plunger 66 withdrawn from contact with relief valve operating stem 58 and also exerts pressure to hold handle 70 in its horizontal position. Relief valve 56 is seated on face 50 of the piston, and is held there both by pressure exerted by spring 60 and by pressure exerted from inlet passage 23 through by-pass sleeve 31 and by-pass grooves 45.

When operating handle 70 is deflected in any direction, plunger head 67 is moved inward and plunger 66 rocks the relief valve, as indicated by dotted lines in Fig. 1. As soon as the relief valve is open, pressure is immediately reduced in the piston chamber above piston 46 and the piston thereupon rises under pressure from annular chamber 30, unsealing outlet passage 22. It will be noted that relief apertures 55 are considerably larger in total cross-section than by-pass 31. The upward movement of the piston is limited by the position of set screw 39, contact with which also serves to exert pressure to seat relief valve 56. Water flows from inlet passage 23 through annular space 30, over valve seat 28, and down through outlet passage 22. The amount of flow depends upon the extent piston 46 moves upward, and may, therefore, be adjusted through the medium of screw 39.

When handle 70 is released, spring 76 immediately forces both the handle and plunger 66 back to their normal positions. Water from inlet passage 23 pours slowly upward through by-pass 31, annular space 21, by-pass grooves 45, into the piston chamber above piston 46. Pressure above the piston gradually builds up and forces the piston back into sealing contact with valve seat 28. As piston 46 moves downward to the closed position, water flowing against relief valve operating stem 58 tends to oscillate the valve in an objectionably noisy manner. Spring 60 prevents such action.

Reverse pressure attendant upon the creation of a vacuum in inlet passage 23 is opposed both by spring 60 acting upon the relief valve and by the frictional relationship between piston 46 and liner 43. Since the maximum pressure differential in such a situation is not usually greater than 13 pounds per square inch, spring 60 is of sufficient strength to withstand that pressure against the under side of relief valve 56. I also design the piston to have such frictional engagement with sleeve 43 as to resist the same pressure differential exerted from outlet passage 22. In this connection, the virtue of combining the rubber piston with the tapering sleeve becomes apparent.

By virtue of the tapered relationship between the piston and the liner, the abnormal friction necessary to withstand the siphon effect is engendered only at the bottom of the piston stroke when the valve is seated. It will be noted, in Fig. 1, that at the bottom position there is only a relatively thin cushion of rubber between the non-resilient spider 53 and the inner peripheral wall of the tapered sleeve 43. As the piston moves upward, the radial pressure of the piston against the sleeve is decreased rapidly and the importance of flange 48 as a seal is increased. Because of the relatively large forces developed by ordinary water pressures acting against such surfaces, friction does not interfere with the operation of the valve. In fact, the increased friction at the bottom of the piston stroke has one desirable effect, in that it causes the piston to move upward suddenly when that friction is overcome, and also retards the downward or closing movement of the piston.

The piston wall is of such an extent longitudinally, however, that there would be ordinarily some tendency for the piston to stick at its seat when the pressure upward is mainly that exerted in annular space 30. An important factor in the construction of my valve that reduces such tendency of the piston to stick is the fact that the piston is of rubber and the surrounding wall is of glass.

I have found that rubber, when lubricated by water, will not bind in a positive manner against glass. In order to insure lubrication of the coacting surfaces by water, I have provided the annular recess 52 around the periphery of the piston. This recess serves to entrap water and to distribute the water between the coacting surfaces. Even when such a valve is not open for an extensive period of time, the piston will act efficiently.

It is apparent then, that by providing a resilient piston having an unconfined diameter greater than the diameter of the retaining piston chamber wall, I have developed sufficient friction to resist siphonage when a vacuum is in the feed pipe, and that I have solved certain problems in such frictional relationship, first, by providing a tapered wall around the piston, second, by providing rubber and glass coacting surfaces in a water medium, and, third, by designing the piston with peripheral recesses for distributing the water between the coacting surfaces. A shallow peripheral recess of the configuration shown tends to disappear under radial pressure, therefore, by virtue of the recess more surface of the piston is in frictional contact with the sleeve at the closed position of the valve than at the open position. The structure shown, then, not only provides for variable pressure radially but also and concurrently variable areas in contact.

The construction of a modified form of my piston to be employed in low-pressure water systems, is indicated in Figs. 4 and 5. The modified piston 77 is similar to the first form in general configuration, differing only in the shape of its peripheral surface. There is a central peripheral flange 78 extending radially outward from the piston and dividing its peripheral surface into two peripheral recesses 79, formed by increasing the diameter of the piston towards upper edge 80 and towards lower edge 81.

It is contemplated that when the second form of piston is installed within a valve, as indicated by Fig. 5, edges 80 and 81 will have but slight frictional relationship with piston chamber sleeve 43a, these edges serving merely as guides to keep the piston axially aligned with the sleeve, while the central flange 78, compressed by the sleeve, serves as the necessary seal. Other parts of this figure are similar to parts correspondingly numbered in the other figures.

For the purpose of completely disclosing my invention and illustrating the principles involved, I have described in specific detail the preferred form of my improvement. The invention is, however, suggestive of a wide range of modifications and structural changes, and I, therefore, reserve the right to all such changes and modifications that properly come within the scope of my appended claims. For example, for the purposes of my invention, smooth, hard, non-porous, non-corrosive materials such as bakelite and similar compositions may be substituted for glass and are to be considered equivalent thereof. The term "vitreous-like" in my claims is to be defined broadly to include such materials.

Having described my invention, I claim:

1. A flush valve having, in combination: a body having an inlet passage and an outlet passage; a valve seat associated with the outlet passage; a frusto-conical sleeve of vitreous-like material housed within the body, with its smaller end adjacent the valve seat; a circular rubber valve member spanning the sleeve to slide axially therein, one face of the valve member being adapted to seal said valve seat; a by-pass providing communication between the inlet passage and the space in the sleeve adjacent the opposite face of the valve member; a relief passage providing communication between said space in the sleeve and the outlet passage; and a manually operable auxiliary relief valve normally closing the relief passage.

2. A flush valve having, in combination: a body having an inlet passage and an outlet passage; a valve seat associated with the outlet passage; a frusto-conical sleeve housed within the body with its smaller end adjacent the valve seat; a frusto-conical rubber valve member spanning the sleeve to slide axially therein, the smaller face of the valve member being adapted to seal said valve seat; a by-pass providing communication between the inlet passage and the space in the sleeve adjacent the opposite face of the valve member; a relief passage providing communication between said space in the sleeve and the outlet passage; and a manually operable auxiliary relief valve normally closing the relief passage.

3. A flush valve having, in combination: a body having a piston chamber, an inlet passage and an outlet passage; a sleeve of vitreous-like material lining said chamber; a valve seat at one end of the chamber associated with the outlet passage; a relatively thick rubber piston axially slidable in the sleeve to and from sealing contact with the valve seat, said piston having a peripheral recess to trap water when confined in said sleeve; a relatively small by-pass providing communication between the inlet passage and the piston chamber; a relatively large relief passage providing communication between the outlet passage and the piston chamber; and a manually operable relief valve controlling the relief passage.

4. A flush valve having, in combination: a body having an inlet passage and an outlet passage; a valve seat associated with the outlet passage; a frusto-conical sleeve of vitreous-like material housed within the body, with its smaller end adjacent the valve seat; a circular rubber valve member spanning the sleeve to slide axially therein, one face of the valve member being adapted to seal said valve seat, said valve member having a peripheral recess when confined in said sleeve; a by-pass providing communication between the inlet passage and the space in the sleeve adjacent the opposite face of the valve member; a relief passage providing communication between said space in the sleeve and the outlet passage; and a manually operable auxiliary relief valve normally closing the relief passage.

5. A flush valve having, in combination: a body having an inlet passage and an outlet passage; a valve seat associated with the outlet passage; a frusto-conical sleeve housed within the body with its smaller end adjacent the valve seat; a frusto-conical rubber valve member spanning the sleeve to slide axially therein, the smaller face of the valve member being adapted to seal said valve seat, said valve member having a peripheral recess when confined in said sleeve; a by-pass providing communication between the inlet passage and the space in the sleeve adjacent the opposite face of the valve member; a relief passage providing communication between said space in the sleeve and the outlet passage; and a manually operable auxiliary relief valve normally closing the relief passage.

6. A flush valve having, in combination: a body having a piston chamber, an inlet passage and an outlet passage; a valve seat associated with the outlet passage; a rubber piston axially slidable in the chamber to and from sealing contact with the valve seat, said piston being sufficiently compressed radially by the chamber wall to remain unmoved under approximately 13 pounds per square inch preponderance of pressure from the outlet passage when the piston is seated; a by-pass providing communication between the inlet passage and the piston chamber; a relief passage providing communication between the outlet passage and the piston chamber; a manually operable relief valve controlling said relief passage; and yielding means normally holding the relief valve closed, said means being of sufficient strength to withstand approximately 13 pounds per square inch preponderance of pressure on the outlet side of the relief valve.

7. A flush valve having, in combination: a body having an inlet passage, an outlet passage and an intermediate frusto-conical piston chamber tapering inward towards said outlet passage; a valve seat in the chamber at the end of the outlet passage; a rubber piston confined with substantial radial pressure in the chamber for movement to and from sealing contact with the valve seat; said piston fitting into the said frusto-conical chamber with sufficient friction to maintain itself on the said seat against approximately thirteen pounds per square inch preponderance of pressure on the outlet face of the piston; a by-pass providing communication between the inlet passage and the piston chamber; a relief passage providing communication between the outlet passage and the piston chamber; a relief valve controlling the relief passage; yielding means normally holding the relief valve closed; and manually operable means to open the relief valve.

8. A flush valve having, in combination: a body having an inlet passage, an outlet passage and an intermediate frusto-conical piston chamber tapering inward towards said outlet passage; a valve seat in the chamber at the end of the outlet passage; a frusto-conical rubber piston confined with substantial radial pressure in the chamber for movement to and from sealing contact with the valve seat, the smaller face of the piston being disposed towards the valve seat; said piston fitting into the said frusto-conical chamber with sufficient friction to maintain itself on the said seat against approximately thirteen pounds per square inch preponderance of pressure on the outlet face of the piston; a by-pass providing communication between the inlet passage and the piston chamber; a relief passage providing communication between the outlet passage and the piston chamber; a relief valve controlling the relief passage; yielding means normally holding the relief valve closed; and manually operable means to open the relief valve.

9. A flush valve having, in combination: a body having an inlet passage, an outlet passage and an intermediate frusto-conical piston chamber tapering inward towards said outlet passage; a valve seat in the chamber at the end of the outlet passage; a frusto-conical rubber piston axially slidable in the chamber to and from sealing contact with the valve seat, the smaller face of the piston being disposed towards the valve seat, said piston having one or more peripheral recesses when confined in said piston chamber; a by-pass providing communication between the inlet passage and the piston chamber; a relief passage providing communication between the outlet passage and the piston chamber; a relief valve controlling the relief passage; yielding means normally holding the relief valve closed; and manually operable means to open the relief valve.

10. A flush valve having, in combination: a body having an inlet passage, an outlet passage and an intermediate frusto-conical piston chamber tapering inward towards said outlet passage; a valve seat in the chamber at the end of the outlet passage; a one-piece rubber piston axially slidable in the chamber to and from sealing contact with the valve seat, said piston being of a normal diameter and resiliency to create sufficient friction with the chamber walls to withstand approximately 13 pounds per square inch preponderance of pressure on the outlet face of the piston; a by-pass providing communication between the inlet passage and the piston chamber; a relief passage providing communication between the outlet passage and the piston chamber; a manually operable relief valve controlling said relief passage; and yielding means normally holding the relief valve closed, said means being of sufficient strength to withstand approximately 13 pounds per square inch preponderance of pressure on the outlet side of the relief valve.

11. A flush valve having, in combination: a body having an inlet passage, an outlet passage and an intermediate frusto-conical piston chamber tapering inward towards said outlet passage; a valve seat in the chamber at the end of the outlet passage; a frusto-conical rubber piston axially slidable in the chamber to and from sealing contact with the valve seat, the smaller face of the piston being disposed towards the valve seat, said piston having one or more peripheral recesses, said piston, at the sealing position, being compressed radially by the chamber to create sufficient friction to withstand approximately 13 pounds per square inch preponderance of pressure on the outlet face of the piston; a by-pass providing communication between the inlet passage and the piston chamber; a relief passage providing communication between the outlet passage and the piston chamber; a manually operable relief valve controlling said relief passage; and yielding means normally holding the relief valve closed, said means being of sufficient strength to withstand approximately 13 pounds per square inch preponderance of pressure on the outlet side of the relief valve.

12. A flush valve having, in combination: a body having a piston chamber, an inlet passage and an outlet passage; a valve seat associated with the outlet passage; a by-pass providing communication between the inlet passage and the piston chamber; a rubber piston axially slidable in the chamber to and from sealing contact with the valve seat, said piston having a plurality of apertures, said piston fitting into the chamber with sufficient friction to withstand approximately 13 pounds per square inch preponderance of pressure on the outlet face of the piston; yielding means on the stem acting against the piston to seat the valve member, said yielding means being of sufficient strength to withstand approximately 13 pounds per square inch preponderance of pressure from the outlet passage; and manually operable means to actuate said stem.

13. A flush valve having, in combination: a body having a piston chamber and an inlet passage and an outlet passage communicating with the chamber; a by-pass providing communication between the inlet passage and the piston chamber; a valve seat in the chamber at the end of the outlet passage; a frusto-conical sleeve of vitreous-like material lining the chamber with its smaller end concentric to and disposed towards the valve seat; a frusto-conical rubber piston axially slidable in the chamber to and from sealing contact with the valve seat, the smaller end of the piston being disposed towards the seat, said piston having a peripheral recess, said piston having a plurality of relatively large apertures therethrough; a valve member normally sealing said apertures and having an operating stem extending through one of said apertures into the outlet passage; yielding means on the stem acting against the piston to seat the valve member; and manually operable means to actuate said stem.

14. A flush valve having, in combination: a body having an inlet passage and an outlet passage; a valve seat at the inner end of the outlet passage; a piston chamber in the body having frusto-conical walls tapering inward towards the valve seat; a resilient piston axially slidable in the chamber to and from sealing contact with the valve seat; said piston fitting into the said frusto-conical chamber with sufficient friction to maintain itself on the said seat against approximately thirteen pounds per square inch preponderance of pressure on the outlet face of the piston; a non-resilient core within said resilient piston; a by-pass providing communication between the inlet passage and the piston chamber; a relief passage providing communication between the outlet passage and the piston chamber; and a manually operable auxiliary relief valve controlling the relief passage.

15. A flush valve having, in combination: a valve chamber having frusto-conical walls of vitreous-like material; a frusto-conical rubber valve member slidable in said chamber from an open position at the larger end of the chamber to a closed position at the smaller end of the chamber and vice versa; and a non-resilient core embedded in said rubber valve member laterally near its smaller end to increase the friction between the valve member and the chamber walls at the closed position of the valve.

16. In a flush valve, the combination of: a valve body having a laterally disposed inlet passage, a longitudinally disposed outlet passage, and a valve chamber at the inner end of said outlet passage; a removable member sealing the outer end of said valve chamber; a circular sleeve of vitreous-like material in the valve chamber secured by said removable member, there being a by-pass from the inlet passage to the valve chamber outside the sleeve and around the upper edge of the sleeve; a circular rubber valve member slidingly mounted in said sleeve to move into sealing relation with the inner end of said outlet passage, said valve member having a relief passage therethrough; a normally closed valve controlling said relief passage; and manually operable means to open said relief valve.

17. In a flush valve, the combination of: a valve body having a laterally disposed inlet passage, a longitudinally disposed outlet passage, and a valve chamber at the inner end of said outlet passage; a removable member sealing the outer end of said valve chamber; a frusto-conical sleeve in the valve chamber secured by said removable member with its smaller end adjacent the inner end of said outlet passage, there being a by-pass from the inlet passage to the valve chamber outside the sleeve and around the upper edge of the sleeve; a frusto-conical resilient valve member slidingly mounted in said sleeve to move into sealing relation with the inner end of said outlet passage, said valve member having a peripheral recess when confined in the sleeve, said valve member having a relief passage therethrough, a normally closed valve controlling said relief passage; and manually operable means to open said relief valve.

18. In a flush valve, the combination of: a valve body having a laterally disposed inlet passage, a longitudinally disposed outlet passage, and a valve chamber at the inner end of said outlet passage; a removable member sealing the outer end of said valve chamber; a frusto-conical sleeve of vitreous-like material in the valve chamber secured by said removable member with its smaller end adjacent the inner end of said outlet passage, there being a by-pass from the inlet passage to the valve chamber outside the sleeve and around the upper edge of the sleeve; a frusto-conical rubber valve member slidingly mounted in said sleeve to move into sealing relation with the inner end of said outlet passage, said valve member having a peripheral recess when confined in the sleeve, said valve member having a relief passage therethrough; a normally closed valve controlling said relief passage; and manually operable means to open said relief valve.

19. A flush valve having a body of resilient material and of frusto-conical form, said valve having an opening therethrough, and a metal core embedded in the said resilient body, said core having an opening therethrough aligning with the opening through the resilient valve body, so that said valve presents a resilient face at each end of the frusto-conical body.

GEORGE C. DUNCAN, Jr.